(12) United States Patent
Rode (10) Patent No.: US 6,283,639 B1
(45) Date of Patent: Sep. 4, 2001

(54) BEARING ASSEMBLY ADJUSTABLE SPACER AND SYSTEM FOR ADJUSTING THE SAME

(76) Inventor: John E. Rode, Persse Rd., Fonda, NY (US) 12068

( * ) Notice: Subject to any disclaimer, the term of this patent is extended or adjusted under 35 U.S.C. 154(b) by 0 days.

(21) Appl. No.: 09/108,514

(22) Filed: Jul. 1, 1998

Related U.S. Application Data (63) Continuation of application No. 09/058,059, filed on Apr. 9, 1998, and a continuation-in-part of application No. 08/661,349, filed on Jun. 14, 1996, now Pat. No. 5,785,434, which is a continuation of application No. 08/191,551, filed on Feb. 3, 1994, now Pat. No. 5,549,397.

(51) Int. Cl.$^7$ .................................................. F16C 19/38
(52) U.S. Cl. ............................................................. 384/551
(58) Field of Search .............................................. 384/551

(56) References Cited

U.S. PATENT DOCUMENTS 3,900,232 * 8/1975 Rode .
5,402,560 * 4/1995 Rode ........................................ 29/252
5,549,397 8/1996 Rode ..................................... 384/551

* cited by examiner

Primary Examiner—Lenard A. Footland
(74) Attorney, Agent, or Firm—Heslin Rothenberg Farley & Mesiti P.C.

(57) ABSTRACT

A system for adjusting an adjustable spacer is provided. A high-compression section is adapted to receive the spacer for a bearing assembly. A low-compression section is adapted to receive the bearing assembly. In one aspect, a transfer frame can serve as a mechanical interface between the high-compression section and the low-compression section. Also, the transfer frame can be adapted to transfer to the low-compression section a first travel indicative of a first compression of the spacer with the high-compression section. A sensor can be coupled with the high-compression section and the low-compression section. Further, the sensor can serve to limit the first compression according to a second travel indicative of a second compression of the bearing assembly with the low-compression section. Additionally, the first travel and the second travel are preferably related to provide a desired adjustment (e.g., preloading) to the spacer.

19 Claims, 8 Drawing Sheets

BEARING ASSEMBLY ADJUSTABLE SPACER AND SYSTEM FOR ADJUSTING THE SAME

CROSS-REFERENCE TO RELATED APPLICATION

This application is a continuation of application Ser. No. 09/058,059, filed Apr. 9, 1998, and is a continuation-in-part application of U.S. patent application Ser. No. 08/661,349 filed on Jun. 14, 1996 issued on Jul. 28, 1998, and now U.S. Pat. No. 5,785,434 which is a continuation of U.S. patent application Ser. No. 08/191,551, filed on Feb. 3, 1994, issued Aug. 27, 1996, and now U.S. Pat. No. 5,549,397.

TECHNICAL FIELD

This invention relates, generally, to the field of spindle mounted bearings and, more particularly, to an adjustable spacer placed between such bearings mounted on a spindle or the like, as well as a system for adjusting such an adjustable spacer.

BACKGROUND ART

Anti-friction bearings serve to decrease friction of and provide support for, for example, a hub upon which a wheel is mounted, for instance, to rotate about a spindle. Such bearings may comprise roller bearings, for example, tapered roller bearings. The spindle may comprise, for instance, an axle or a shaft.

A typical tapered roller bearing includes a cone having an inner race for mounting on a spindle, a cup having an outer race for mounting in a hub, and a plurality of roller elements within a roller cage positioned between the inner and outer races. Commonly, a pair of such tapered roller bearings are mounted on a spindle for rotation thereabout of a wheel mounted on a hub. Cooperating bearings, such as a pair of tapered roller bearings, may be included in a bearing assembly.

In order to properly secure bearings in many axle, spindle, and transmission assemblies, it is necessary to retain the bearings tightly under a predetermined axial load on the shaft or axle, so that they will maintain the proper running clearance of the roller elements under the influence of the combined axial and radial forces which they are designed to support. It is often the practice of manufacturers of such assemblies to carefully measure the space between the bearing inner races, and provide a spacer of precisely the correct dimension and load requirements to fit therebetween. The spacer is often made of ground steel tubing to a length tolerance of plus or minus one half of one thousandth of an inch. If the bearings are not maintained at a proper load the bearings may not roll properly or may prematurely wear, particularly if the bearings are maintained at too high of a load, or may, if maintained under too low of a load, have excessive play causing failure of the bearings and wheel supported thereon.

Certain assemblies employ an adjustable spacer or load ring which can be fitted by means of loading within the assembly. In assemblies which are subject to high loading during service, it may be required that the spacer have a very high capacity to resist being deformed. In one example, an adapter sleeve optionally may be employed in conjunction with the spacer between a pair of roller bearings, such as for accommodation of differing spindle dimensions at each bearing location.

An exemplary embodiment of such an adapter sleeve and adjustable spacer is disclosed in commonly owned U.S. Pat. No. 5,549,397 to Rode (entitled "Adapter Sleeve and an Adjustable Spacer With Radial Extension Useable Thereon" and issued Aug. 27, 1996) and in commonly owned U.S. application Ser. No. 08/661,349 of Rode (entitled "Adjustable Bearing Assembly and Adapter Sleeve Therefor" and filed Jun. 14, 1996), which are hereby incorporated herein by reference in their entireties.

One approach to preparing a bearing assembly with an adjustable spacer which is subject to high-shock loading, requires sensing of the resistance to rolling torque that is encountered when a tapered roller bearing is loaded axially. The sensed resistance is used as an indicator of whether the bearings are correctly positioned.

However, some assemblies do not permit such an approach, such as where the bearing is pre-assembled as a cone and cup assembly with a lubrication seal. In particular, the seal, when new, can cause a significant resistance to rolling torque, thereby interfering with the ability to sense the rolling drag of a lightly-preloaded bearing.

In other designs, it may be preferable to use a method of adjusting the spacer without relying upon torque resistance measurement. Unfortunately, such a method can undesirably require the making of dimensional measurements, which are desirable to avoid since they are time-consuming and allow errors to be introduced by the assembler.

Thus, a need exists for improving performance, easing use, and increasing adjustability of an adjustable spacer employed with a bearing assembly. A further need exists for improving ease, accuracy, and control of adjustment to an adjustable spacer employed with a bearing assembly. A need also exists for decreasing dimensional measurements required to properly prepare a spacer and bearing assembly. An additional need exists for decreasing the number of parts, and attendant positioning complexity, required to satisfy a function provided by an adapter sleeve and an adjustable spacer employed with a bearing assembly.

SUMMARY OF THE INVENTION

Pursuant to the present invention, shortcomings of the existing art are overcome and additional advantages are provided through the provision of a bearing assembly adjustable spacer and a system for adjusting the same. In a first aspect of the invention, an adjustable spacer includes a first end portion, a second end portion, and a deformable portion. The first end portion is formed to generally axially abut a first part of a first bearing and generally radially abut a first location about a first dimension of a spindle. The second end portion is formed to generally axially abut a second part of a second bearing and generally radially abut a second location about a second dimension of the spindle. The first dimension is different from the second dimension. The first end portion is formed to accommodate the first dimension. The second end portion is formed to accommodate the second dimension. The deformable portion allows a desired adjustment to be provided to the spacer.

In one aspect of the invention, a spacer-adjustment system includes a high-compression section and a low-compression section. The high-compression section is adapted to receive a spacer for a bearing assembly. The low-compression section is adapted to receive the bearing assembly. Also, a selected limit of travel during compression of the bearing assembly with the low-compression section, serves to provide a desired adjustment to the spacer with the high-compression section.

In another aspect of the invention, the desired adjustment can comprise a preload. The bearing assembly can include a bearing housing, a hub, a first bearing, a second bearing and/or a displacement gage. Also, the displacement gage can be adapted to separate the first and second bearings by a gaged distance. The low-compression section can serve to substantially replicate a selected spindle for mounting of the bearing assembly.

The high-compression section can include a hydraulic cylinder, an electrohydraulic mechanism, and/or a lead screw device for providing the desired adjustment to the spacer. A sensor can signal the hydraulic cylinder and/or the electrohydraulic mechanism to halt compression for accomplishment of the desired adjustment. A sensor can activate a brake for the lead screw device to accomplish the desired adjustment.

The selected limit of travel can be signalled by a sensor. The'sensor can comprise a pressure switch. The sensor can be adapted to be adjusted to account for a deflection of the sensor upon a contact thereof.

The high-compression section can be connected with the low-compression section for transfer therebetween of a dimension of space remaining in the bearing assembly for the spacer. The dimension of space can be employed in providing the desired adjustment to the spacer.

A transfer frame, an air cylinder, and/or a tie bar can serve to connect the high-compression section with the low-compression section. The high-compression section can be adapted to exert a high force on the spacer. Also, the low-compression section can be adapted to exert a low force on the bearing assembly. Further, the high force and the low force can have a scaled relationship.

The low-compression section can include a mechanism for assuring the desired adjustment allows proper seating of at least one component of the bearing assembly. The mechanism can comprise a device for rotating at least the at least one component of the bearing assembly.

In yet another aspect of the present invention, a spacer-adjustment system includes a high-compression section and a low-compression section. The high-compression section is adapted to receive a spacer for a bearing assembly. The low-compression section is adapted to receive the bearing assembly. A transfer frame serves as a mechanical interface between the high-compression section and the low-compression section. Also, the transfer frame is adapted to transfer to the low-compression section a first travel indicative of a first compression of the spacer with the high-compression section. A sensor is coupled with the high-compression section and the low-compression section. Further, the sensor serves to limit the first compression according to a second travel indicative of a second compression of the bearing assembly with the low-compression section. Additionally, the first travel and the second travel are related to provide a desired adjustment to the spacer.

The invention further contemplates a method for deforming a spacer useable for separating bearings mounted on a spindle. The spacer is placed in a variable length adjustment chamber of a high-compression section. The bearings are positioned in a low-compression section. Also, the positioning of the bearings serves to resemble an arrangement of the bearings separated by the spacer on the spindle. The length adjustment chamber is decreased to exert a first compressive force on the spacer. A second compressive force is applied on the bearings according to a selected relationship between the spacer and at least one of the bearings and/or the spindle. There is sensed a result in the low-compression section of the second compressive force. The result is employed to limit the decreasing of the variable length adjustment chamber, and provide the spacer with a desired adjustment.

In a further aspect of the invention, the selected relationship between the spacer and at least one of the bearings and/or the spindle can be configured for transfer between the high-compression section and the low-compression section of a dimension of space between the bearings, for the spacer. At least one component of the bearings can be rotated to assure proper seating thereof.

Thus, the present invention advantageously provides improved performance, easier use, and increased adjustability of an adjustable spacer employed with a bearing assembly. Further, the invention improves ease, accuracy, and control of adjustment to an adjustable spacer employed with a bearing assembly. Also, the present invention decreases requirements for dimensional measurements to properly prepare a spacer and bearing assembly. Additionally, the invention decreases the number of parts, and attendant positioning complexity, required to satisfy a function provided by an adapter sleeve and an adjustable spacer employed with a bearing assembly.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be readily understood from the following detailed description of preferred embodiments taken in conjunction with the accompanying drawings in which:

BEST MODE FOR CARRYING OUT THE INVENTION

In accordance with the principles of the present invention, a system for adjusting an adjustable spacer is provided.

Examples of an adjustable spacer and a system for adjusting the same, incorporating and using the novel features of the present invention are depicted in the Figures and described in detail herein.

Figure 1:
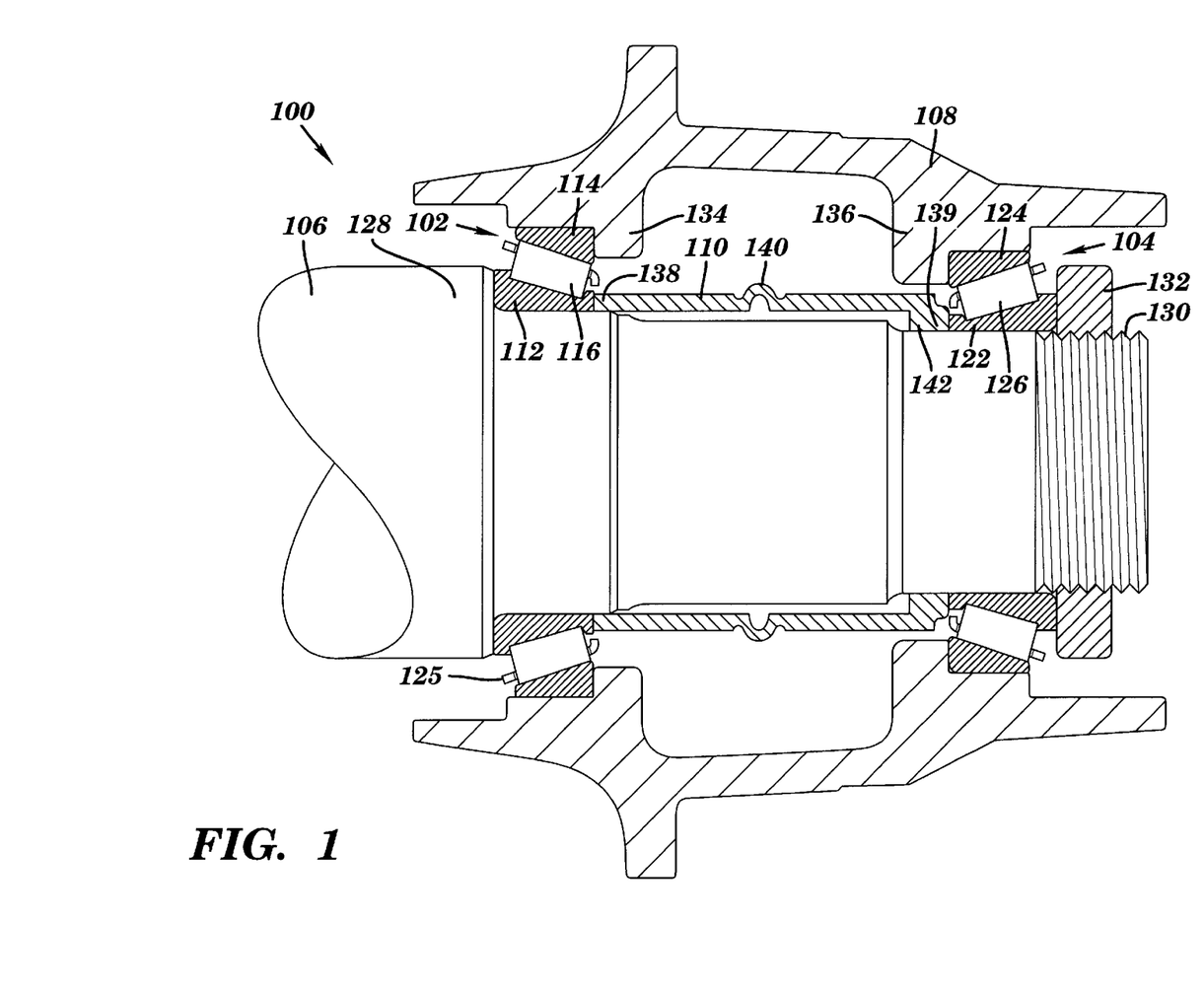
FIG. 1 is a cutaway, sectional, partial, side view of one-example or an adjustable spacer in a bearing assembly between a spindle and a hub incorporating and using the capabilities of the present invention.

In an exemplary embodiment depicted in FIG. 1, bearing assembly 100 includes inner and outer bearings 102 and 104, respectively. For purposes of illustration, FIG. 1 depicts the bearings mounted on a spindle which comprises axle 106. Such a spindle may comprise a shaft. The bearings may include, for instance, a pair of identical but opposed tapered roller bearings, as depicted in FIG. 1. In addition, one or more of the bearings may comprise an unsealed or a sealed bearing, as will be understood by those skilled in the art. Further below is discussed a mechanism which may be employed to accommodate use of a sealed bearing.

Bearings 102 and 104 support, for example, a bearing housing or hub 108 (FIG. 1). As will be understood by those skilled in the art, the hub may support any appropriate component(s) of, for instance, a wheel or tire (not shown). Furthermore, adjustable spacer 110 (FIG. 1) may be located axially between the bearings and radially between axle 106 and the hub, as described herein.

Referring to FIG. 1, bearing 102 may comprise a tapered roller bearing which includes inner race 112 mounted on axle 106, outer race 114 mounted in hub 108, and roller elements 116 positioned between the inner and outer races. Similarly, bearing 104 may comprise a tapered roller bearing which includes inner race 122 mounted on the axle, outer race 124 mounted in the hub, and roller elements 126 positioned between the inner and outer races 122 and 124, respectively. One or more of the bearing may employ roller cage(s) 125 in order to hold roller elements 116, 126 in proper position between the corresponding inner and outer races, as will be understood by those skilled in the art.

Still referring to FIG. 1, axle 106 may include shoulder 128 for receiving inner race 112 of inner bearing 102. Furthermore, the axle may include screw thread(s) 130 for receiving nut 132. The nut may thus be tightened, such as to abut inner race 122 of outer bearing 104, for cooperative provision of axial support among bearing assembly 100, adjustable spacer 110, hub 108 and the axle, as described herein.

In one example, as depicted in FIG. 1, hub 108 may be mounted on outer races 114 and 124 for rotation about axle 106, with roller elements 116 positioned between the outer race 114 and inner race 112, and roller elements 126 positioned between the outer race 124 and inner race 122, where the inner races may be mounted on the axle. In an alternative embodiment, the axle may rotate within the hub, in accordance with the principles of the present invention. That is, the axle and/or the hub could serve as, and/or resemble, a stator and/or a rotor, as will be appreciated by those skilled in the art. For purposes of illustration, the description herein emphasizes an embodiment in which the axle serves as a stator, and the hub serves as a rotor.

As illustrated in FIG. 1 for explanatory purposes, hub 108 may include inner shoulder 134 and outer shoulder 136. The inner shoulder may serve to receive outer race 114 of inner bearing 102. The outer shoulder may serve to receive outer race 124 of outer bearing 104.

In accordance with the principles of the present invention, adjustable spacer 110 may include inner end 138 and outer end 139. In one example, the inner end may axially abut inner race 112 of inner bearing 102, and may radially abut a first location on axle 106. Also, the outer end may axially abut inner race 122 of outer bearing 104, and may radially abut a second location on the axle. In an alternative embodiment, where the axle may serve as a rotor and hub 108 may serve as a stator, the adjustable spacer preferably would axially abut outer races 114 and 124 and radially abut location(s) of the hub, rather than location(s) on the axle, as will be appreciated by those skilled in the art.

Referring to FIG. 1, adjustable spacer 110 preferably includes bend 140. In one example, the bend may serve to allow adjustment to, for instance, axial length of the adjustable spacer, and/or other characteristic(s) and/or behavior(s) of the adjustable spacer. As described herein, adjustment(s) to the bend may allow, for example, preloading of bearing assembly 100. Preloading of the adjustable spacer may be necessary to allow for the proper axial loading on the bearing assembly, including the adjustable spacer. Proper axial loading may be necessary to allow the bearings to obtain optimal performance and maximal life, with substantial elimination of play therein.

Moreover, referring still to FIG. 1, adjustable spacer 110 may include flange 142. The flange may serve to allow, for instance, positioning of inner bearing 102 about a first diameter of axle 106 which is different from a second diameter of the axle about which outer bearing 104 is mounted, as depicted in FIG. 1 for purposes of illustration. Such flange(s) may be formed at any appropriate location(s) of the adjustable spacer, and/or with respect to any appropriate location(s) of, for instance, the axle, as will be appreciated by those skilled in the art.

Additional description of exemplary feature(s) for adjustable spacer 110 appears further below.

Figure 2:
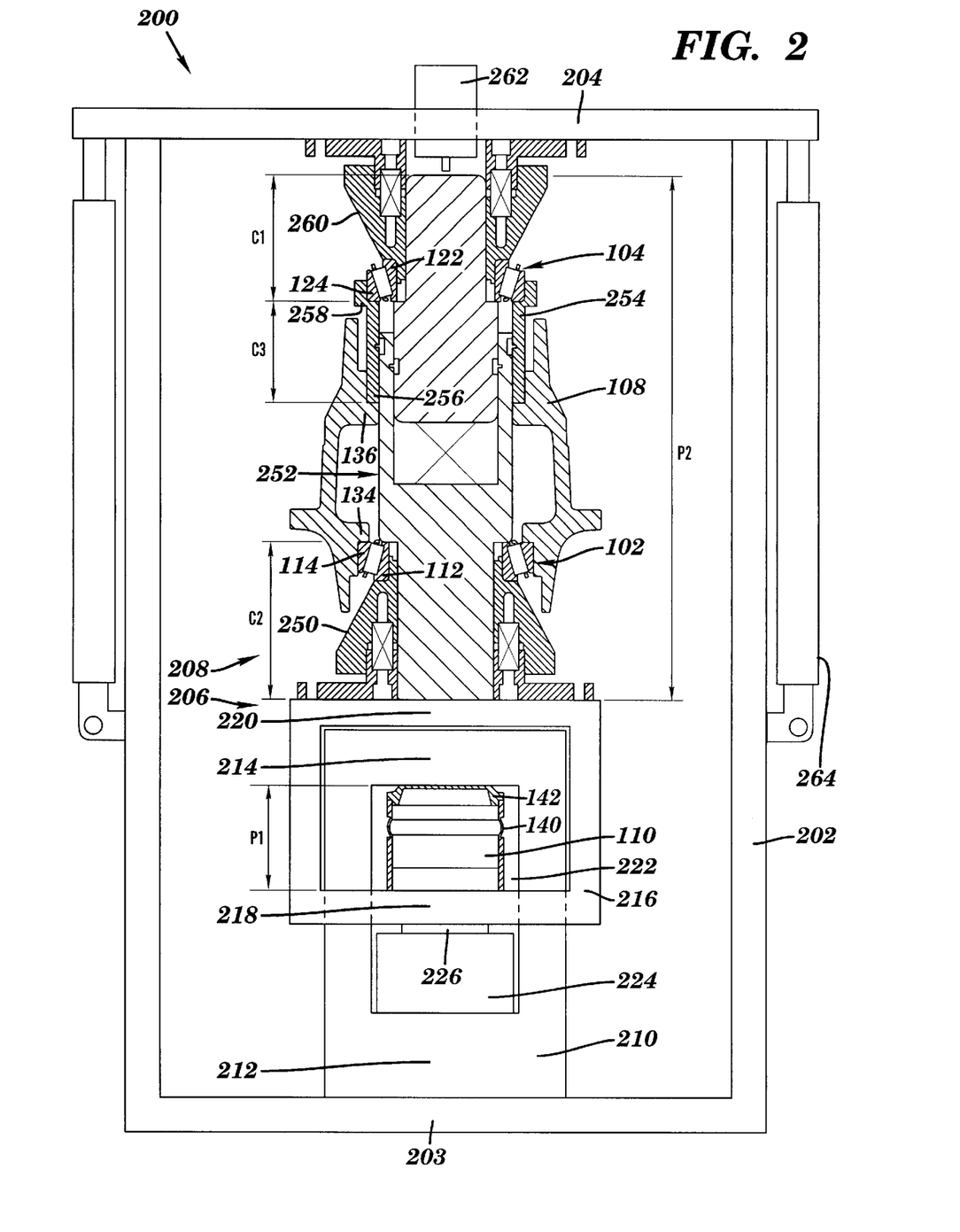
FIG. 2 is a cutaway, sectional, partial, elevation, side view of one example of a system for adjusting the adjustable spacer of FIG. 1 incorporating and using the capabilities of the present invention.

FIG. 2 depicts an exemplary system 200 for providing adjustment(s) to adjustable spacer 110. In accordance with the principles of the present invention, the system may serve to advantageously provide the adjustable spacer with, for instance, a desired preload suited to the actual tolerance(s) of, for example, bearings 102 and 104 and hub 108 before mounting and axial loading thereof, such as about axle 106 (FIG. 1), as described herein.

In one example, system 200 includes outer frame 202 which includes proximal and distal platforms 203 and 204, respectively. The outer frame may house high-compression section 206 and low-compression section 208. The high-compression section includes base 210, which includes proximal and distal walls 212 and 214, respectively, and linear-transfer frame 216, which includes proximal and distal walls 218 and 220, respectively.

In accordance with the principles of the present invention, bearings 102 and 104 and hub 108 are positioned in low-compression section 208 for adjustment and crushing (e.g., preloading of) adjustable spacer 110, which is positioned separately in high-compression section 206, as described herein. Preferably, the bearings, the hub, and the adjustable spacer are subsequently assembled together, as depicted in FIG. 1.

Referring to FIG. 2, base 210 may be supported with proximal platform 203. Further, the base and linear-transfer frame 216 may have a telescopic engagement, which may be employed to define variable length adjustment chamber 222, which is preferably suited for receiving and adjusting adjustable spacer 110, as described herein.

Further, base 210 may house a prime mover such as hydraulic cylinder 224 with piston 226, or, in an alternative embodiment, an electrohydraulic mechanism and/or a mechanical lead screw device, as will be understood by those skilled in the art. In one example, actuation of the hydraulic cylinder in order to extend the piston distally, serves to advance proximal wall 218 of linear-transfer frame 216 toward distal wall 214 of the base, and (e.g., linearly) decrease length adjustment chamber 222 as it holds adjustable spacer 110, in accordance with the principles of the present invention. Furthermore, proximal retraction of the piston results in proximal wall 218 retreating proximally from distal wall 214, for (e.g., linear) increase of the length adjustment chamber holding the adjustable spacer.

Base 210, in one example, may be formed to withstand high forces with very small deflections. Preferably, the base is constructed to deflect less than 0.001 in. Under a force of fifty thousand pounds.

For illustrative purposes, FIG. 2 may be considered to depict system 200 with an axial orientation generally opposed to an effective direction of gravitational force. While part(s) of the description herein, for explanatory purposes, may imply certain exemplary direction(s), such direction(s) may be considered relative. As will be appreciated by those skilled in the art, the significance of, for example, a "vertically upward" direction in many environments stems from its opposition to a dominant "downwardly" acting gravitational force, resulting from the presence of a large mass such as the Earth, where "vertical" approximates radial alignment therewith. Furthermore, a "horizontal" direction and a "vertically upward" direction can be readily ascertained following determination of an appropriate "downward" direction.

Design choice(s) allow accommodation(s) of any orientation(s) for any system(s) in accordance with the principles of the present invention.

Referring to FIG. 2, sufficient distal advancement of proximal wall 218 of linear-transfer frame 216 toward distal wall 214 of base 210 serves to engage adjustable spacer 110 with both walls 214 and 218. Thereafter, additional distal advancement results in application to the adjustable spacer of a (e.g., linear) compressive force. In accordance with the principles of the present invention, the compressive force can serve to axially deform or crush the adjustable spacer, such as for preloading thereof. Moreover, bend 140 may be formed with a relatively-decreased radial thickness, as depicted in FIG. 1, which may serve to concentrate thereat compressive force(s) applied axially to the adjustable spacer, as will be appreciated by those skilled in the art.

In one aspect, high-compression section 206 may serve to desirably preload adjustable spacer 110 according to actual tolerance(s) and/or other physical characteristic(s) of bearings 102 and 104 as well as hub 108, as described herein.

Referring to FIG. 2, high-compression section 206 may support low-compression section 208. In one example, distal wall 220 of linear-transfer frame 216 may serve as a mechanical interface between the high-compression and low-compression sections, as described herein.

As depicted in FIG. 2 for illustrative purposes, low-compression section 208 includes spring-loaded mount 250, which may be mounted to distal wall 220 of linear-transfer frame 216. So, (e.g., linear) movement of the linear-transfer frame may be transferred from high-compression section 206 to the low-compression through distal wall 220. Also, hydraulic cylinder 224, by actuation, through piston 226, of distal advancement and proximal retraction of distal wall 218 of the linear-transfer frame, can distally advance and proximally retract the spring-loaded mount of the low-compression section.

Referring to FIG. 2, spring-loaded mount 250, in one embodiment, supports inner bearing 102. Namely, the spring-loaded mount receives inner race 112 of the inner bearing. Additionally, the inner race 112 in turn supports spring-loaded cone gage 252, which serves as a proxy for axle 106 (FIG. 1), as described herein. Furthermore, the inner bearing partially supports hub 108. That is, outer race 114 receives inner shoulder 134. Additionally, the spring-loaded cone gage supports inner race 122 of outer bearing 104, as described herein.

For explanatory purposes, FIG. 2 depicts a mechanism which allows, for instance, outer bearing 104 to comprise, for example, a sealed bearing. As will be appreciated by those skilled in the art, use of a sealed bearing for one or more of bearings 102 and 104 presents a challenge, owing to the undesirability of damaging the sealed bearing(s), such as during removal from low-compression section 208, for example, in order to be subsequently installed on axle 106, as depicted in FIG. 1. In one aspect, the present invention addresses this challenge with cone-displacement gage 254, as described herein.

As depicted in FIG. 2, cone-displacement gage 254 includes inner end 256 and outer end 258, which serve to substantially replicate a mechanical interface, that is depicted in FIG. 1, between outer race 124 and shoulder 136. Namely, as depicted in FIG. 2, by seating the inner end 256 at the shoulder 136, and seating outer race 124 at the outer end 258, the cone-displacement gage serves to simply add an axial offset represented by gage length C3. Accommodation of the axial offset represented by gage length C3 in performing adjustment of adjustable spacer 110 is discussed further below. Moreover, an additional mechanism similar to the cone-displacement gage could also be employed, for example, should bearing 102 comprise a sealed bearing, as will be appreciated by those skilled in the art.

Figure 3:
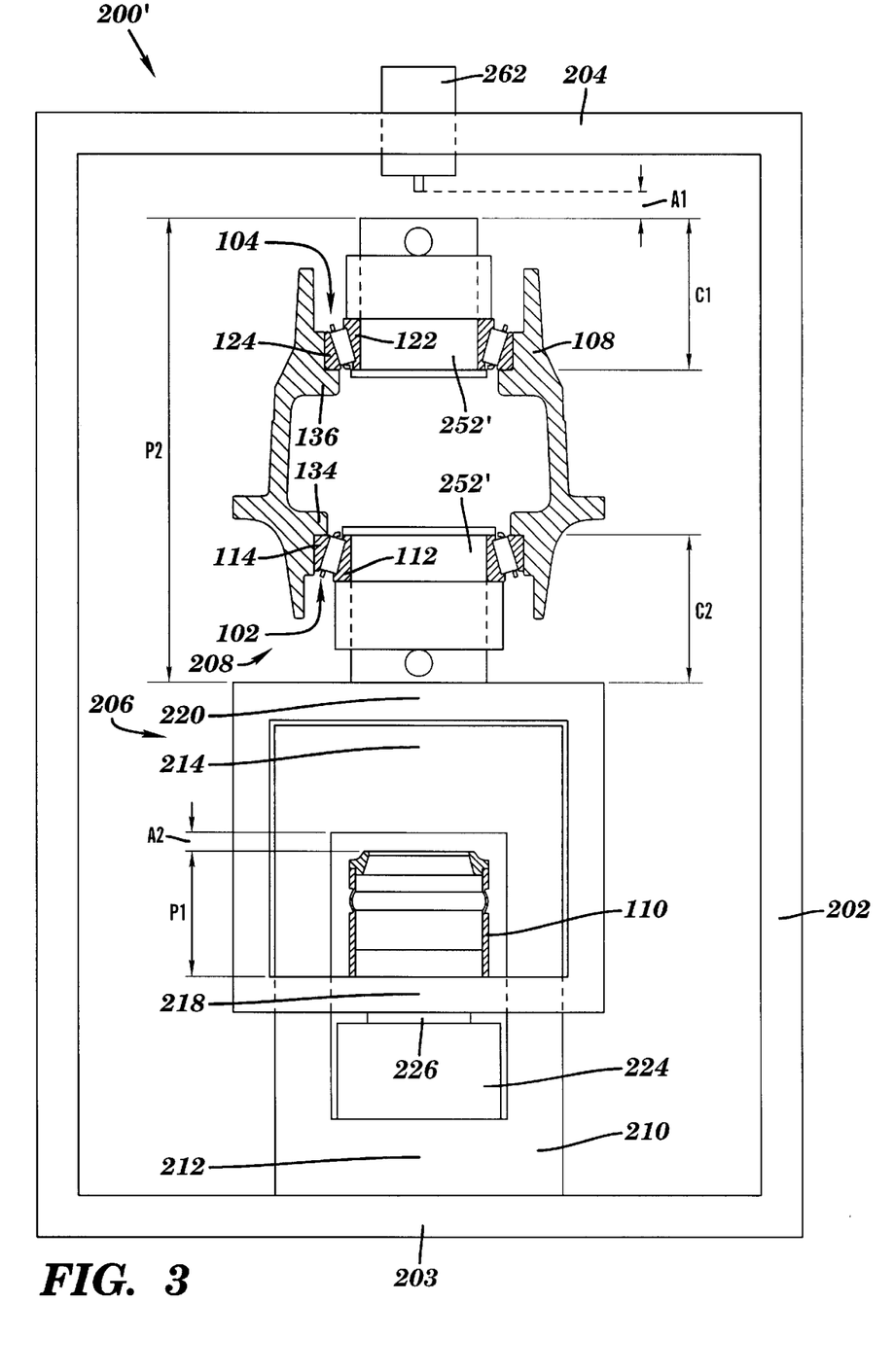
FIG. 3 is a cutaway, sectional, partial, elevation, side representation of another example of a system for adjusting the adjustable spacer of FIG. 1 incorporating and using the capabilities of the present invention.

FIG. 3 represents another exemplary system, namely, system 200', serving to illustrate a system such as system 200 (FIG. 2) at a time when cone-displacement gage 254 (FIG. 2) is not used, as will be appreciated by those skilled in the art. In contrast to system 200, system 200' abuts outer race 124 with shoulder 136. For example, system 200' may advantageously be employed when neither roller bearing 102 nor roller bearing 104 is a sealed bearing, in-accordance with the principles of the present invention. In one example, cone gage 252', which serves as a proxy for axle 106 (FIG. 1), may be supported by inner race 112, and may support inner race 122 of outer bearing 104, as described herein.

Returning to FIG. 2, spring-loaded clamp 260 may be mounted to distal platform 204 for abutment with inner race 122. Additionally, the distal platform may serve to adjustably support, for example, a sensor such as travel sensor 2G2 (e.g., a pressure switch)t. In on e example, the travel sensor is capable of sensing contact with cone gage 252 at a low, predetermined level of contact force, as described herein. Also, the distal platform may be moved axially with, for instance, air lift cylinder(s) 264. In an alternative embodiment, tie bar(s) may be used, as will be understood by those skilled in the art.

With reference to the Figures, exemplary operation of systems in accordance with the present invention is now described, starting with initialization and calibration thereof. Referring to FIG. 2, hydraulic cylinder 224 may retract piston 226 proximally. Air cylindery s) 264 may be extended axially, in order to distally extend distal platform 204.

Calibration may be performed as follows. As will be appreciated by those skilled in the art, two solid gage blocks (not shown), one solid gage block for high-compression section 206 and another solid gage block for low-compression section 208, may be employed for calibration, as described below.

Referring again to FIG. 2, the first solid gage block may be placed in high-compression section 206 at length adjustment chamber 222, as indicated by first gage length P1. The second solid gage block may be placed in low-compression section 208 as indicated by second gage length P2. In particular, the second gage length is preferable selected to substantially equal the sum of the length of the first gage length plus a number of gage length(s) of the low-compression section, as will be appreciated by those skilled in the art.

In one example, as depicted in FIG. 2, second gage length P2 equals first gage length P1 plus gage lengths C1, C2, and C3. In another example, as depicted in FIG. 3, the second gage length P2 equals the first gage length P1 plus gage lengths C1 and C2. In particular, system 200' (FIG. 2) lacks gage length C3 (FIG. 2), owing to the omission of cone-displacement gage 254 (FIG. 2), as discussed above.

Further referring to FIG. 2, air cylinder(s) 264 may be retracted axially, in order to proximally retract distal platform 204 and clamp the second solid gage block, indicated by second gage length P2, in low-compression section 208. Next, the first solid gage block, indicated by first gage length P1, is clamped in high-compression section 206. Now, travel sensor 262 is set to a desired reading contacting the second solid gage block in the low-compression section, in accordance with the principles of the present invention. At this point, system 200 is calibrated, as will be appreciated by those skilled in the art.

Pressure in hydraulic cylinder 226 and air cylinder(s) 264 may be relaxed, and distal platform 204 may be extended distally. The first and second solid gage blocks may be removed, and preferably stored away safely. As will be appreciated by those skilled in the art, the above calibration should only have to be performed once, but can be checked by a user (e.g., a customer of the system) easily, and as often as required and/or desired, in accordance with the principles of the present invention.

As depicted in FIG. 3, a system of the present invention, such as system 200' or system 200 (FIG. 2), may be advantageously arranged so axial distance A1, between travel sensor 262 and spring-loaded cone gage 252' (or spring-loaded cone gage 252, as depicted in FIG. 2), is substantially equal to axial distance A2, between distal end of adjustable spacer 110 and distal wall 214, plus a selected preload for the adjustable spacer, in accordance with the principles of the present invention.

With reference to the Figures, now are described exemplary steps for production use of system(s) of the present invention. In one example, adjustable spacer 110 is positioned in variable length adjustment chamber 222 of high-compression section 206, as depicted in FIG. 2. Hub 108 with inner bearing 102 is set on spring-loaded mount 250. Spring-loaded cone gage 252 with cone-displacement gage 254 attached are moved proximally through the hub and the inner bearing. At this point, the proximal end of the spring-loaded cone gage preferably will not yet abut distal wall 220 of linear-transfer frame 216, as will be appreciated by those skilled in the art.

Still referring to FIG. 2, outer bearing 104 is telescoped proximally to abut spring-loaded cone gage 252 and cone-displacement gage 254. In an alternative embodiment, as depicted in FIG. 3, the outer bearing would be telescoped proximally to abut the spring-loaded cone gage and hub 108.

Referring again to FIG. 2, air cylinder(s) 264 are axially retracted in order to move distally and position spring-loaded clamp 260, travel sensor 262, and distal platform 204. At this point, in one example, the spring force in the spring-loaded clamp in conjunction with the static weight of hub 108, serve to overcome the spring force in spring-loaded cone gage 252 and spring-loaded mount 250, until the proximal end of the spring-loaded cone gage abuts distal wall 220 of linear-transfer frame 216, at gage length C2. Further, the spring force in the spring-loaded mount preferably serves to keep inner race 112 of inner bearing 102 in abutment with the spring-loaded cone gage. Referring to FIG. 2, the hub with the inner race of the inner bearing, and cone-displacement gage 254 with inner race 124 of outer bearing 104 preferably can be rotated at this point, because of clearance between the spring-loaded gage and the cone displacement gage. Such rotation may desirably serve to assure that roller elements 16, 126 (FIG. 1) are properly seated within the bearings. With respect to system 200' depicted in FIG. 3, the hub with the inner race of the inner bearing, and the inner race of the outer bearing, obviously could be rotated at such a point.

Again referring to FIG. 2, in one embodiment, the calculation of the spring loads serves to ensure spring-loaded clamp 260 does not override the combined loads on spring-loaded mount 250 after the proximal end of the spring-loaded cone gage abuts distal wall 220 of linear-transfer frame 216, at gage length C2, as will be appreciated by those skilled in the art. Furthermore, a positive locking clamp comprising the spring-loaded mount, could be employed to clamp from spring-loaded cone gage 252 to inner race 112 of inner bearing 102, for ensured abutment therebetween.

In one example, hydraulic cylinder 224 now may actuate piston 22G in order to compress adjustable spacer 110 in length until the distal end of spring-loaded cone gage 252 contacts travel sensor 262, at gage length C1, in accordance with the principles of the present invention. Preferably, adjustment may be made to account for small deflection(s) of the travel sensor upon contact (e.g., at a low predetermined force), and to account for a proper transfer of a dimension of space remaining in bearing assembly 100 for the adjustable spacer, to length adjustment chamber 222. At contact of the travel sensor, in one embodiment, the hydraulic pressure of the hydraulic cylinder is preferably released, for proximal retraction of piston 224. For instance, such mechanism(s) may be achieved by employing a hydraulic circuit and/or an electrohydraulic unit (not shown), as will be appreciated by those skilled in the art. In an alternative embodiment, the travel sensor may signal activation of a brake for a lead screw device, as will be appreciated by those skilled in the art. Furthermore, air cylinder(s) 264 may be axially extended to distally move distal platform 204. Additionally, bearings 102 and 104, the gages 252 and 254 (or simply gage 252', as depicted in FIG. 3 and described herein), hub 108 and adjustable spacer 110 may be removed, the adjustable spacer having been adjusted and preloaded by crushing within length adjustment chamber 222 in accordance with principles of the present invention. The adjustable spacer 110, bearings 102 and 104, and hub 108 may then be mounted on an axle or spindle, such as that shown in FIG. 1. When mounted on the axle or spindle 106, the nut 132 is tightened to a desired torque setting and the adjustable spacer 110 has been crushed to a length so that the optimal amount of force is translated therethrough at the desired torque setting. This enables the bearings to rotate at their optimal performance and for maximal life.

For instance, adjustable spacer 110 may be formed with carbon steel to have an approximate axial length of four inches. In one example, the adjustable spacer may initially have a generally cylindrical shape, and/or a number of generally cylindrical section(s), where machining thereof may be employed to form desired feature(s), as will be understood by those skilled in the art. Typically, when the adjustable spacer is mounted in a bearing assembly as is shown in FIG. 1, the torque on the nut holding the assembly in place may be about 300 ft-lbs, which creates an axial load through the adjustable spacer and bearing assembly of about 10,000 lbs. For safety reasons, it is preferred to make the adjustable spacer crushable in length at a force of at least three to four times the mounted axial load. Therefore, a 10,000 lb loaded adjustable spacer, preferably should be crushable at a force of no less than about 40,000 lbs. Accordingly, hydraulic cylinder 224 must be capable of applying a force to the length adjustment chamber necessary to crush the adjustable spacer.

For purposes of illustration, a number of preferred implementations of adjustable spacer 110 of the present invention are described below with reference to the Figures.

Figure 4:
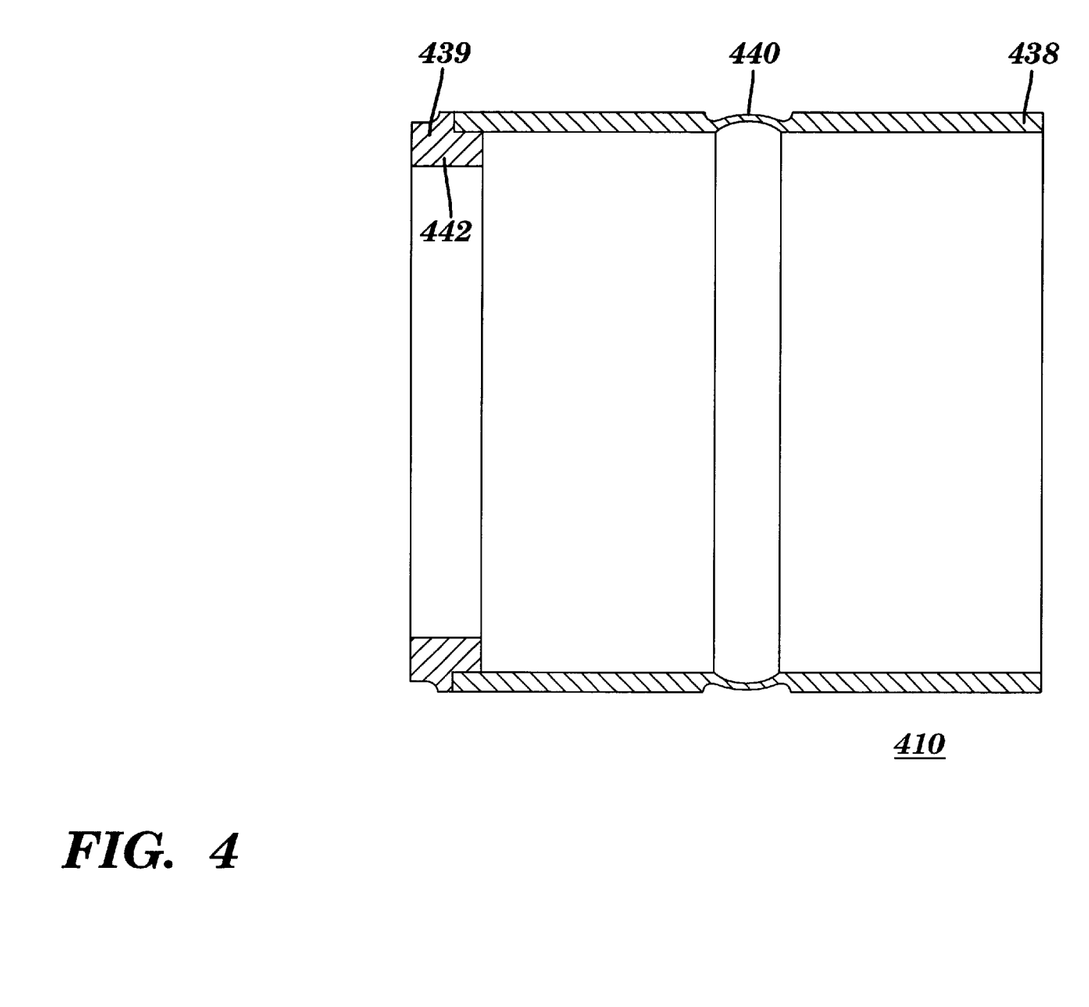
FIG. 4 is a sectional, side view of a first exemplary embodiment of the adjustable spacer of FIG. 1, in accordance with the principles of the present invention.

As a first exemplary embodiment, FIG. 4 depicts adjustable spacer 410 having inner end 438 and outer end 439. In one example, the inner end may axially abut inner race 112 (FIG. 1) of inner bearing 102 (FIG. 1), and may radially abut a first location on axle 106 (FIG. 1). Also, the outer end may axially abut inner race 122 (FIG. 1) of outer bearing 104 (FIG. 1), and may radially abut a second location on the axle.

Adjustable spacer 410 preferably includes bend 440. In one example, the bend may serve to allow adjustment to, for instance, axial length of the adjustable spacer, and/or other characteristic(s) and/or behaviors of the adjustable spacer . As described herein, adjustmentas) to the bend may allow, for example, preloading of bearing assembly 100 (FIG. 1), such as for substantial elimination of play therein.

Moreover, adjustable spacer 410 may include flange 442. The flange may serve to allow, for instance, positioning of inner bearing 102 (FIG. 1) about a first diameter of axle 106 (FIG. 1) which is different from a second diameter of the axle about which outer bearing 104 (FIG. 1) is mounted. Such flange(s) may be formed at any appropriate location(s) of the adjustable spacer, and/or with respect to any appropriate location(s) of, for instance, the axle, as will be appreciated by those skilled in the art. Preferably, the flange is formed integrally with other component(s) of the adjustable spacer.

Figure 5A:
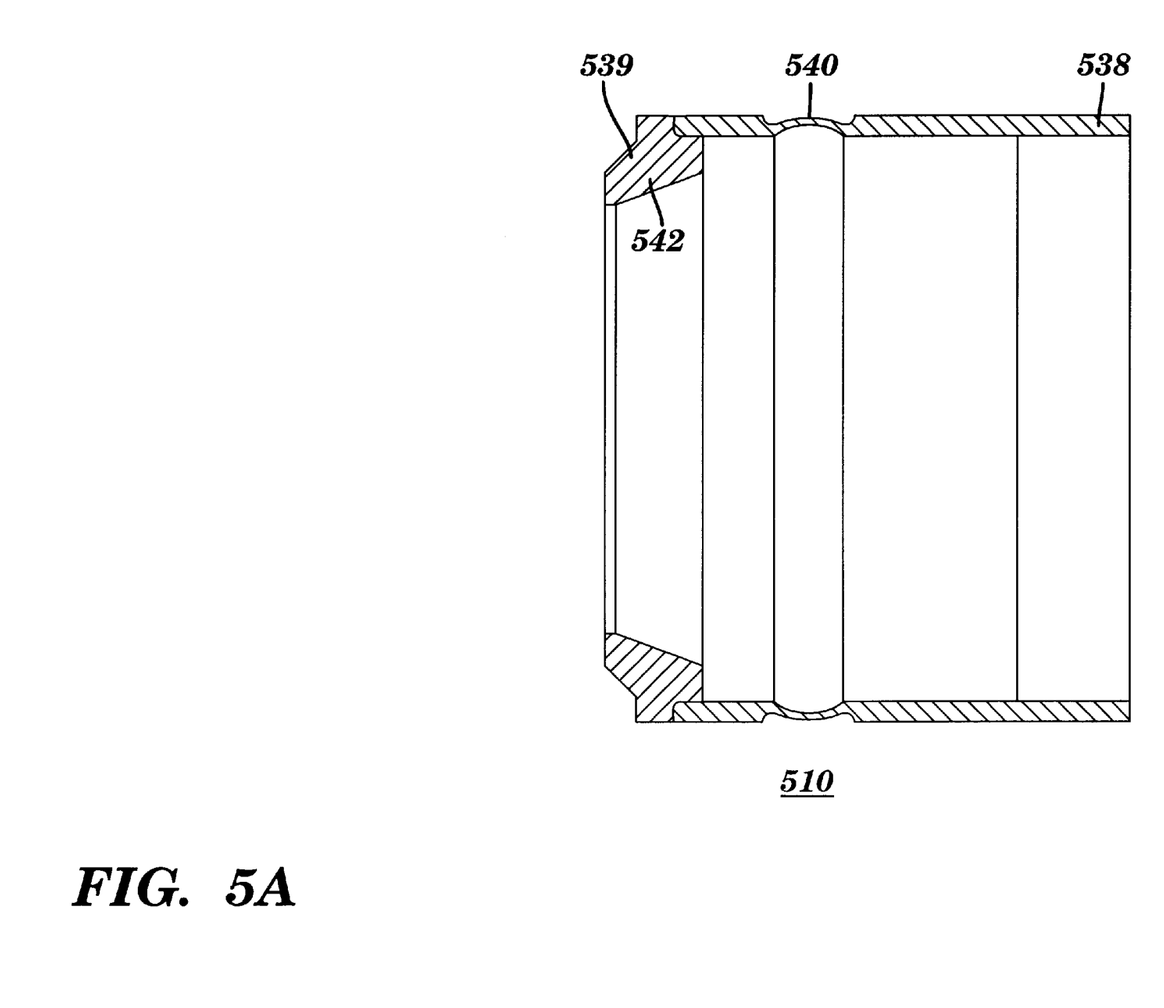
FIG. 5A is a sectional, side view of a second exemplary embodiment of the adjustable spacer of FIG. 1, in accordance with the principles of the present invention.
Figure 5B:
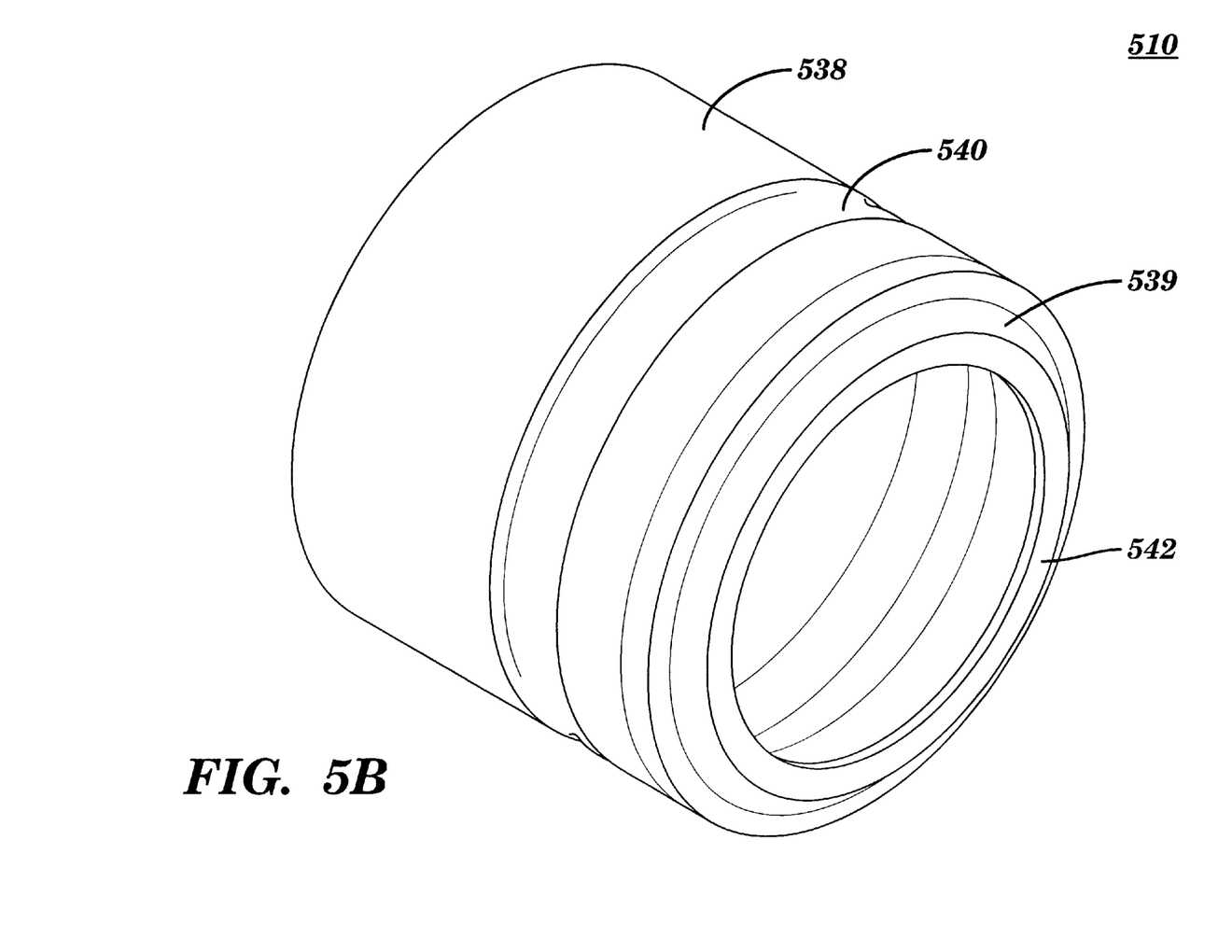
FIG. 5B is an isometric view of the adjustable spacer of FIG. 5A, in accordance with the principles of the present invention.

As a second exemplary embodiment, FIGS. 5A–5B depict adjustable spacer 510 having inner end 538 and outer end 539. In one example, the inner end may axially abut inner race 112 (FIG. 1) of inner bearing 102 (FIG. 1), and may radially abut a first location on axle 106 (FIG. 1). Also, the outer end may axially abut inner race 122 (FIG. 1) of outer bearing 104 (FIG. 1), and may radially abut a second location on the axle.

Adjustable spacer 510 preferably includes bend 540. In one example, the bend may serve to allow adjustment to, for instance, axial length of the adjustable spacer, and/or other characteristic(s) and/or behavior(s) of the adjustable spacer. As described herein, adjustment(s) to the bend may allow, for example, preloading of bearing assembly 100 (FIG. 1), such as for substantial elimination of play therein.

Moreover, adjustable spacer 510 may include flange 542. The flange may serve to allow, for instance, positioning of inner bearing 102 (FIG. 1) about a first diameter of axle 106 (FIG. 1) which is different from a second diameter of the axle about which outer bearing 104 (FIG. 1) is mounted. Such flange(s) may be formed at any appropriate location(s) of the adjustable spacer, and/or with respect to any appropriate location(s) of, for instance, the axle, as will be appreciated by those skilled in the art. Preferably, the flange is formed integrally with other component(s) of the adjustable spacer.

Figure 6:
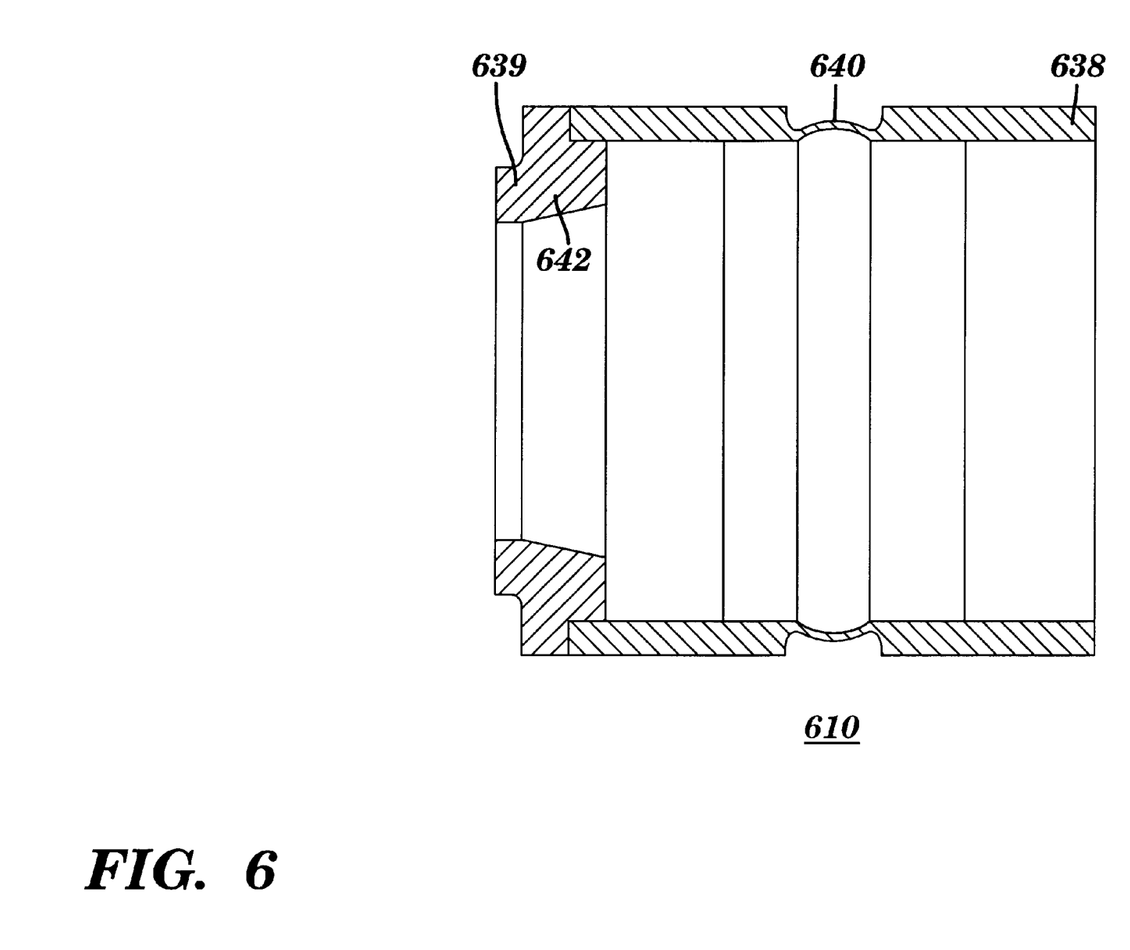
FIG. 6 is a sectional, side view of a third exemplary embodiment of the adjustable spacer of FIG. 1, in accordance with the principles of the present invention.

As a third exemplary embodiment, FIG. 6 depicts adjustable spacer 610 having inner end 638 and outer end 639. In one example, the inner end may axially abut inner race 112 (FIG. 1) of inner bearing 102 (FIG. 1), and may radially abut a first location on axle 106 (FIG. 1). Also, the outer end may axially abut inner race 122 (FIG. 1) of outer bearing 104 (FIG. 1), and may radially abut a second location on the axle.

Adjustable spacer 610 preferably includes bend 640. In one example, the bend may serve to allow adjustment to, for instance, axial length of the adjustable spacer, and/or other characteristic(s) and/or behavior(s) of the adjustable spacer. As described herein, adjustment(s) to the bend may allow, for example, preloading of bearing assembly 100 (FIG. 1), such as for substantial elimination of play therein.

Moreover, adjustable spacer 610 may include flange 642. the flange may serve to allow, for instance, positioning of inner bearing 102 (FIG. 1) about a first diameter of axle 106 (FIG. 1) which is different from a second diameter of the axle about which outer bearing 104 (FIG. 1) is mounted. Such flange(s) may be formed at any appropriate locations of the adjustable spacer, and/or with respect to any appropriate location(s) of, for instance, the axle, as will be appreciated by those skilled in the art. Preferably, the flange is formed integrally with other component(s) of the adjustable spacer.

Figure 7:
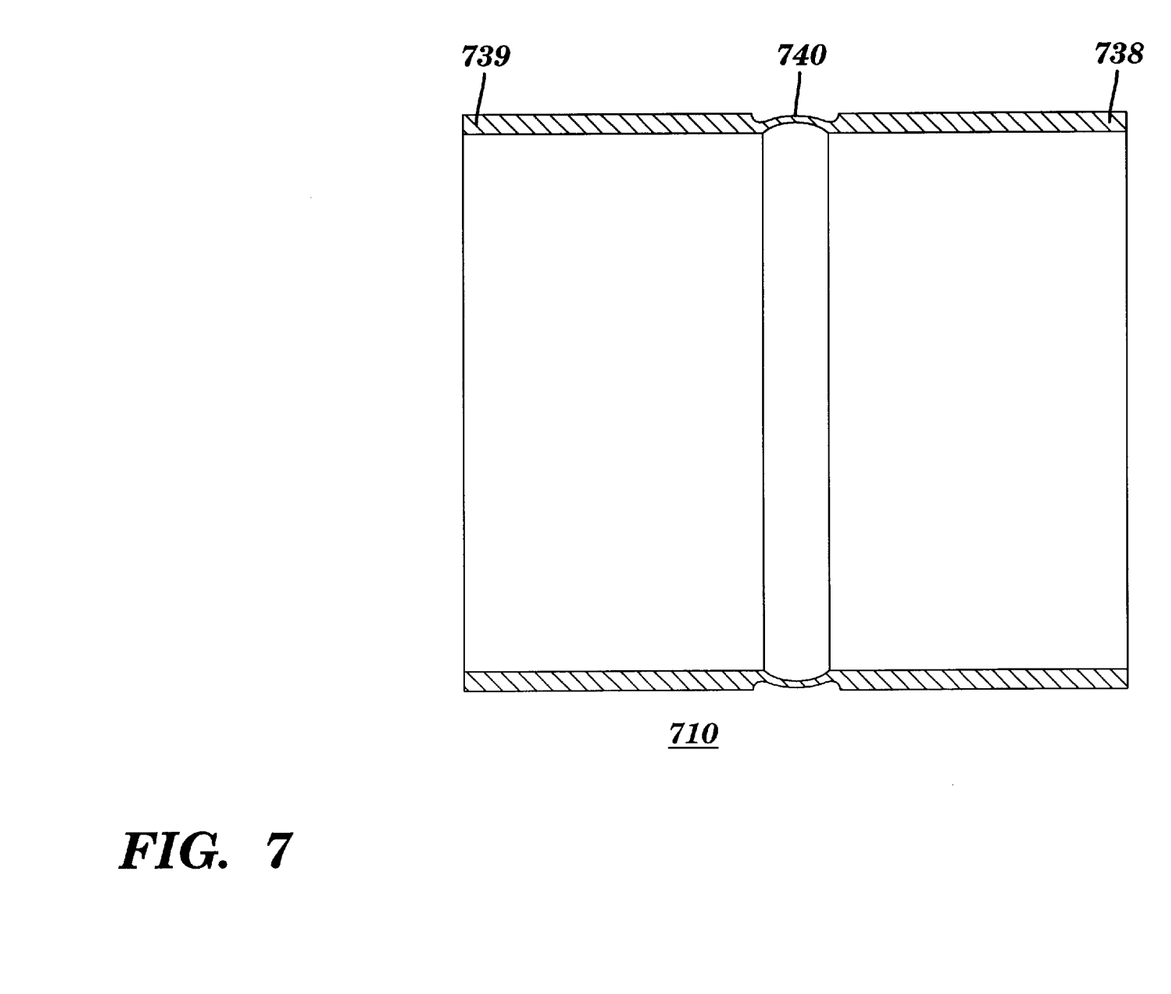
FIG. 7 is a sectional, side view of a fourth exemplary embodiment of the adjustable spacer of FIG. 1, in accordance with the principles of the present invention.

As a fourth exemplary embodiment, FIG. 7 depicts adjustable spacer 710 having inner end 738 and outer end 739. In one example, the inner end may axially abut inner race 112 (FIG. 1) of inner bearing 102 (FIG. 1), and may radially abut a first location on axle 106 (FIG. 1). Also, the outer end may axially abut inner race 122 (FIG. 1) of outer bearing 104 (FIG. 1), and may radially abut a second location on the axle.

Adjustable spacer 710 preferably includes bend 740. In one example, the bend may serve to allow adjustment to, for instance, axial length of the adjustable spacer, and/or other characteristic(s) and/or behaviors of the adjustable spacer. As described herein, adjustment(s) to the bend may allow, for example, preloading of bearing assembly 100 (FIG. 1), such as for substantial elimination of play therein.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. An adjustable spacer, comprising:
    a first end portion formed to generally axially abut a first part of a first bearing and generally radially abut a first location about a first dimension of a spindle;
    a second end portion formed to generally axially abut a second part of a second bearing and generally radially abut a second location about a second dimension of said spindle;
        wherein said first dimension is different from said second dimension, said first end portion formed to accommodate said first dimension, said second end portion formed to accommodate said second dimension; and
    a deformable portion allowing a desired adjustment to be provided to said spacer.

2. The spacer of claim 1, wherein said first end portion, said deformable portion, and said second end portion are formed integrally.

3. The spacer of claim 1, wherein said desired adjustment includes at least one of a preload, an adjustment to an axial dimension of said spacer, and a compression of said deformable portion.

4. The spacer of claim 1, wherein at least one of said first and second end portions includes at least one flange.

5. The spacer of claim 4, wherein said first end portion, said deformable portion, and said second end portion are formed integrally.

6. The spacer of claim 4, wherein said at least one flange and said deformable portion are formed integrally.

7. The spacer of claim 1, wherein at least two of said first end portion, said deformable portion, and said second end portion are formed integrally.

8. The spacer of claim 1, wherein said deformable portion includes at least one of a bend, a curved section, and a compressible portion.

9. The spacer of claim 1, wherein said first end portion generally axially abuts said first part, and wherein said first part comprises at least one of an inner race and an outer race of said first bearing.

10. The spacer of claim 9, wherein said second end portion generally axially abuts said second part, and wherein said second part comprises at least one of an inner race and an outer race of said second bearing.

11. The spacer of claim 1, wherein said first end portion generally radially abuts said first location, and wherein said first location comprises at least one of a first position of said spindle and a second position of a hub.

12. The spacer of claim 11, wherein said second end portion generally radially abuts said second location, and wherein said second location comprises at least one of a third position of said spindle and a fourth position of said hub.

13. The spacer of claim 1, wherein said first end portion generally radially abuts said first location and said second end portion generally radially abuts said second location, wherein said first location comprises a first position about a first diameter of said spindle and said second location comprises a second position about a second diameter of said spindle, and wherein said first diameter is different from said second diameter.

14. An adjustable spacer disposed between first and second tapered roller bearings mounted on a multi-diameter spindle, wherein said first and second tapered roller bearings are oppositely-faced, said spacer comprising:

a first end portion generally axially abutting a first race of said first tapered roller bearing and generally radially abutting a first location about a first diameter of said spindle;

a second end portion generally axially abutting a second race of said second tapered roller bearing and generally radially abutting a second location about a second diameter of said spindle;

wherein said first diameter is different from said second diameter, said first end portion formed to accommodate said first diameter, said second end portion formed to accommodate said second diameter; and a deformable portion located between said first and second end portions.

15. The spacer of claim 14, wherein said deformable portion allows at least one of a desired adjustment and a preload to be provided to said spacer.

16. The spacer of claim 14, wherein said first location comprises at least one of a first position of said spindle and a second position of a hub.

17. The spacer of claim 16, wherein said second location comprises at least one of a third position of said spindle and a fourth position of said hub.

18. The spacer of claim 14, wherein at least one of said first and second end portions includes at least one flange, and wherein said at least one flange and said deformable portion are formed integrally.

19. The spacer of claim 14, wherein said deformable portion includes at least one of a bend, a curved section, and a compressible portion.

\* \* \* \* \*